(12) United States Patent
Rohee et al.

(10) Patent No.: US 6,427,962 B1
(45) Date of Patent: Aug. 6, 2002

(54) SLIDE RAIL FOR A VEHICLE SEAT

(75) Inventors: René Rohee, La Chapelle Biche; Samuel Levallois, Flers, both of (FR)

(73) Assignee: Bertrand Faure Equipements S.A., Boulogne (FR)

( * ) Notice: Subject to any disclaimer, the term of this patent is extended or adjusted under 35 U.S.C. 154(b) by 0 days.

(21) Appl. No.: 09/567,461

(22) Filed: May 9, 2000

(30) Foreign Application Priority Data

May 10, 1999 (FR) .............................. 99 05909

(51) Int. Cl.[7] .............................................. F16M 13/00
(52) U.S. Cl. ........................ 248/424; 248/429; 248/430; 297/463.1
(58) Field of Search ................................ 248/429, 430, 248/424; 297/463.2, 463.1; 296/65.1

(56) References Cited

U.S. PATENT DOCUMENTS

| 5,104,176 A | 4/1992 | Mrozowski ............... 296/187 |
| 5,209,447 A | * 5/1993 | Yokota ..................... 248/429 |
| 5,370,350 A | 12/1994 | Okano et al. ............. 248/430 |
| 5,984,254 A | 11/1999 | Baloche et al. .......... 248/430 |

FOREIGN PATENT DOCUMENTS

| DE | 195 48 871 | | 3/1997 |
| EP | 0 421 300 | | 4/1991 |
| EP | 0 842 807 | | 5/1998 |
| EP | 842808 | * | 5/1998 |
| FR | 2 757 807 | | 7/1998 |
| JP | 62096146 | | 5/1987 |
| JP | 02021024 | | 1/1990 |
| JP | 135266 | * | 5/1994 |
| JP | 181398 | * | 7/1998 |
| JP | 10315816 | | 12/1998 |
| JP | 10315817 | | 12/1998 |

OTHER PUBLICATIONS

French Preliminary Search Report dated Nov. 8, 1999, French Application FR 9905909.

* cited by examiner

Primary Examiner—Kimberly T. Wood
(74) Attorney, Agent, or Firm—Marshall, Gerstein & Borun

(57) ABSTRACT

A slide rail for a vehicle seat, comprising two fixed steel sections of U-shaped cross section fitted without play into an identical fixed outer section made by extrusion from a light alloy.

11 Claims, 1 Drawing Sheet

SLIDE RAIL FOR A VEHICLE SEAT

FIELD OF THE INVENTION

The present invention relates to slide rails for vehicle seats.

More particularly, the invention concerns a vehicle seat slide rail, comprising at least one first fixed steel section of U-shaped cross section, this first fixed steel section having:

a bottom, two side flanges extending parallel to each other, each from the bottom up to a free end, and two fold back flanges extending towards each other respectively from the free ends of the two side flanges, defining between them a slot intended to receive at least one support component adapted to be fixed to the vehicle seat, the first fixed steel section additionally comprising fixing means intended to fix said first fixed steel section to the vehicle floor.

BACKGROUND OF THE INVENTION

Document EP-A-0 842 807 describes an example of such a slide rail.

Known slide rails of this type are entirely satisfactory, but do however have the drawback of forcing the manufacturer of the slide rail to take care over the external finish of the first fixed steel section, so that there is no chance of the user getting dirty or being injured when in contact with it, and so that the slide rail is of good external appearance.

This finish requirement increases the manufacturing cost of the slide rail, by imposing constraints on the manufacturing process of the first fixed steel section.

Moreover, the first fixed steel section is difficult to integrate perfectly into the vehicle floor, bearing in mind its manufacturing process (cutting and bending sheet steel), which allows only limited choice in respect of the shape of said first fixed steel section.

Lastly, the manufacturing processes currently used to make steel slide rail sections allow only relatively short sections to be made easily, which limits the longitudinal adjustment travel of the seat.

OBJECTS AND SUMMARY OF THE INVENTION

A particular object of the present invention is to overcome these drawbacks.

To this end, according to the invention, the first fixed steel section is fitted into a fixed outer section made by extrusion from a material selected from aluminium-based materials and plastic materials, this outer section being fixed to the first steel section and itself having an approximately U-shaped cross section, with a bottom placed against the bottom of the first steel section, two side flanges which surround the flanges of the first steel section, and two fold back flanges which extend the flanges of said fixed outer section by covering the fold back flanges of the first steel section, and said slide rail additionally comprises a second fixed steel section having the same cross section as the first fixed steel section and which is also fitted into the fixed outer section, the first and second fixed steel sections being simply abutted one behind the other in said fixed outer section.

By means of these arrangements, it is possible to make a longer slide rail without being hindered by the limitations of the processes currently used to manufacture steel slide rail sections.

Besides, the first fixed steel section is completely concealed, which allows the manufacturing process of the first fixed steel section to be simplified, since its outer surface no longer needs to be as meticulously prepared as in slide rails of the prior art.

Moreover, bearing in mind the manufacturing process of the fixed outer section, its shape can be selected much more freely than the shape of the first steel section, so that the slide rail can be integrated perfectly into the vehicle floor.

Furthermore, the fixing of the slide rail on the vehicle floor and the sliding mounting of the seat support component is still made by means of the first fixed steel section, which has better mechanical resistance than the fixed outer section: the performance of the slide rail in terms of mechanical resistance is not therefore reduced relative to steel slide rails of the prior art.

Indeed, on the contrary, the fixed outer section contributes to the mechanical resistance of the slide rail by strengthening the first fixed steel section, which if need be allows the thickness of the steel sheet used to make said fixed section to be reduced. As a result savings can be made in the weight and manufacturing costs of the slide rail.

In preferred versions of the invention, use may possibly be made additionally of one and/or other of the following arrangements:

the flanges of the first fixed steel section are held tightly, without play, between the flanges of the fixed outer section;

the flanges of the fixed outer section each comprise at least one longitudinal inner rib which is supported against the corresponding flange of the first fixed steel section;

the fold back flanges of the fixed outer section are supported against the fold back flanges of the first fixed steel section, by applying the bottom of said first fixed steel section against the bottom of the fixed outer section;

each fold back flange of the fixed outer section comprises at least one longitudinal inner rib which is supported against the corresponding fold back flange of the first fixed steel section;

the bottom of the fixed outer section comprises longitudinal inner ribs which are each supported against a side projection of the bottom of the fixed steel section;

the fixing means of the first fixed steel section comprise at least one hole provided in the bottom of said first fixed steel section to receive a screw intended to be fixed to the vehicle floor, the bottom of the fixed outer section also comprising a hole facing the hole provided in the bottom of the first fixed steel section to allow said screw to pass through;

the fixing means of the first fixed steel section comprise at least one screw which passes through the holes provided in the bottom of the first fixed steel section and in the bottom of the fixed outer section, this screw comprising a widened head which is supported against the bottom of the first fixed steel section;

the fold back flanges of the fixed outer section are extended laterally outwards by projecting rims;

a second fixed steel section having the same cross section as the first fixed steel section and which is also fitted in the fixed outer section, the first and second fixed steel sections being simply abutted one behind the other in said fixed outer section; and a movable section which slides in the first fixed steel section, this movable section being partially covered by the fixed outer section between the two fold back flanges of the first fixed steel section and said movable section comprising a web which extends parallel to the side flanges of the first fixed steel section and which passes through a slot delimited between the two fold back flanges of the outer section.

BRIEF DESCRIPTION OF THE DRAWINGS

Other characteristics and advantages of the invention will emerge from the following description of two of its versions, given as non-restrictive examples, in relation to the appended drawings.

In the drawings.

MORE DETAILED DESCRIPTION

In the different figures, the same references denote identical or similar elements.

Figure 1:
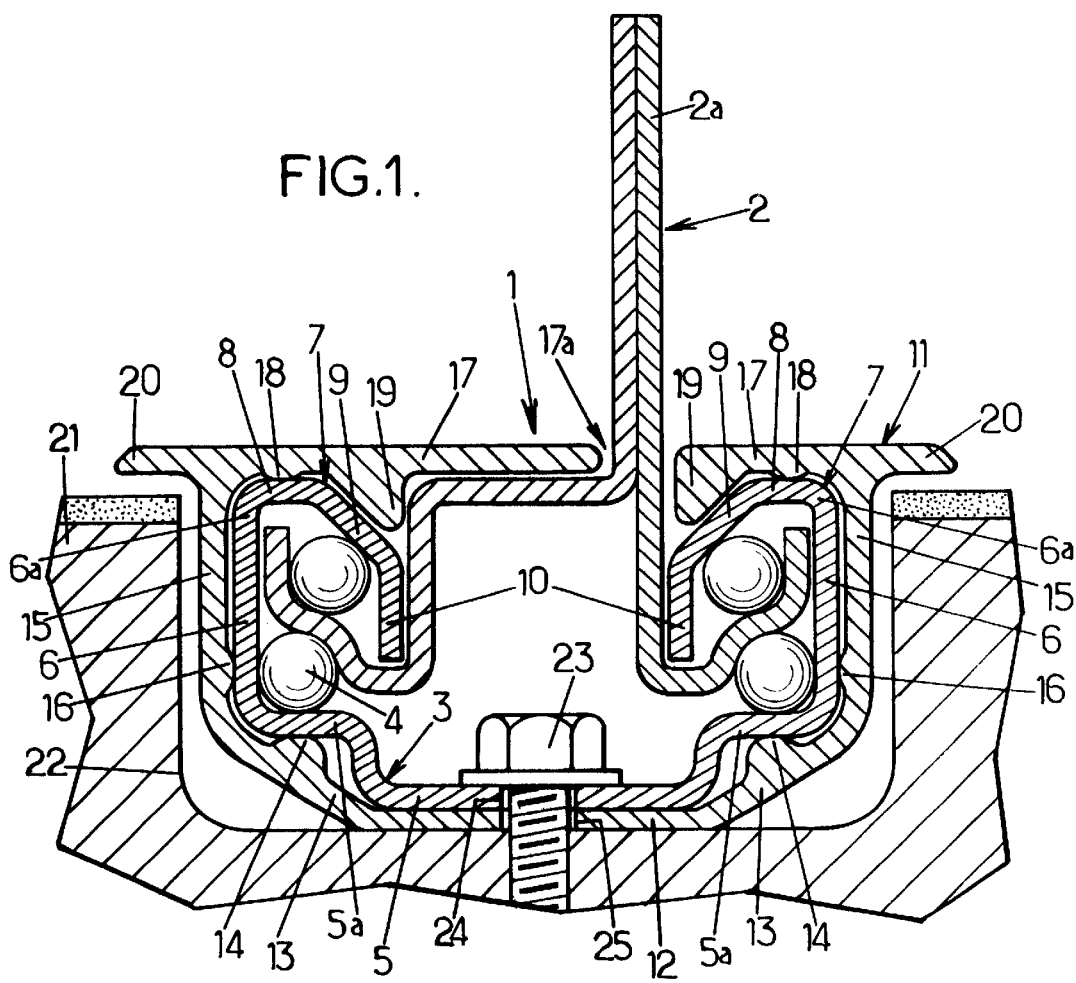
FIG. 1 is a transverse cross section of a slide rail according to a first version form of the invention.

FIG. 1 shows a slide rail 1 for a vehicle seat, comprising a support component such as a movable steel section 2, which is intended to carry the seat and which is sliding mounted in a longitudinal direction on a fixed steel section 3, generally with interposition of bearings 4 between the fixed and movable sections. In the example under consideration, the movable section 2 comprises a thin vertical web 2a constituted by two walls of steel sheets placed side by side and fixed together, which vertical web is fixed to the seat part of the seat.

Locking means (not shown), known per se, are furthermore provided between the fixed and movable sections, to allow the user to adjust the seat position in the longitudinal direction.

The fixed steel section 3 has an approximately U-shaped cross section, which comprises:

a bottom 5, in this case horizontal, which comprises, on its longitudinal edges, two side projections 5a, two vertical side flanges 6 which each extend upwards from the corresponding projection 5a to an upper end 6a.

and two fold back flanges 7 which extend towards each other respectively from the free end 6a of the flanges of the fixed steel section, defining between them a slot receiving the above-mentioned movable section 2.

In the example shown, each fold back flange has a reflex trough shape, and includes a horizontal wall 8 which extends the corresponding vertical flange 6, then a downwards inclined wall 9, then a vertical wall 10.

The fixed steel section 3 is fitted, preferably without play, in a fixed outer section 11, which is made by extrusion, from an aluminium-based (light alloy) material or from a plastic material.

This fixed outer section 11 has an approximately U-shaped cross section, including:

a bottom 12 on which is supported the bottom 5 of the fixed steel section, this bottom 12 including two side edges 13 sloping upwards and each fitted with a longitudinal inner rib 14 supported under the corresponding projection 5a of the bottom of the fixed steel section, two vertical side flanges 15 each extending upwards or from the bottom 12, each of these flanges having a longitudinal inner rib 16 which is supported against the corresponding vertical flange 6 of the fixed steel section, and two horizontal fold back flanges 17 extending the upper ends of the vertical flanges 15 and which extend towards each other beyond the horizontal walls 8 of the fold back flanges 7, partially covering the movable section 2 between the two fold back flanges 7 of the fixed steel section. These fold back flanges 17 leave between them a narrow slot 17a passed through by the web 2a of the movable section 2 with a small degree of play.

Each of these fold back flanges 17 preferably comprises a longitudinal inner rib 18 which is supported on the horizontal wall of the corresponding fold back flange 7 of the fixed steel section. Moreover, each fold back flange 17 comprises to advantage a wedge-shaped rib 19 which approximately hugs the shape of the inclined wall 9 of the corresponding fold back flange 7.

Lastly, each fold back flange 17 is to advantage extended horizontally outwards by a projecting rim 20.

The slide rail can to advantage be integrated into the vehicle floor 21, by being for example placed inside a groove 22 provided in this floor, the rims 20 then slightly covering the floor twenty 21 on either side of the groove 22.

The fixing of the slide rail on the vehicle floor 21 may be done particularly by screwing, by means of a screw 23 which passes through holes 24, 25 provided respectively in mutual correspondence in the bottom of the fixed steel section and of the fixed outer section, the widened head of each screw 23 being supported on the bottom 5 of the section 3. This screwing can be done for example through recesses 23a (FIG. 2) provided in the fixed outer section and if need be in the movable section 2.

Figure 2:
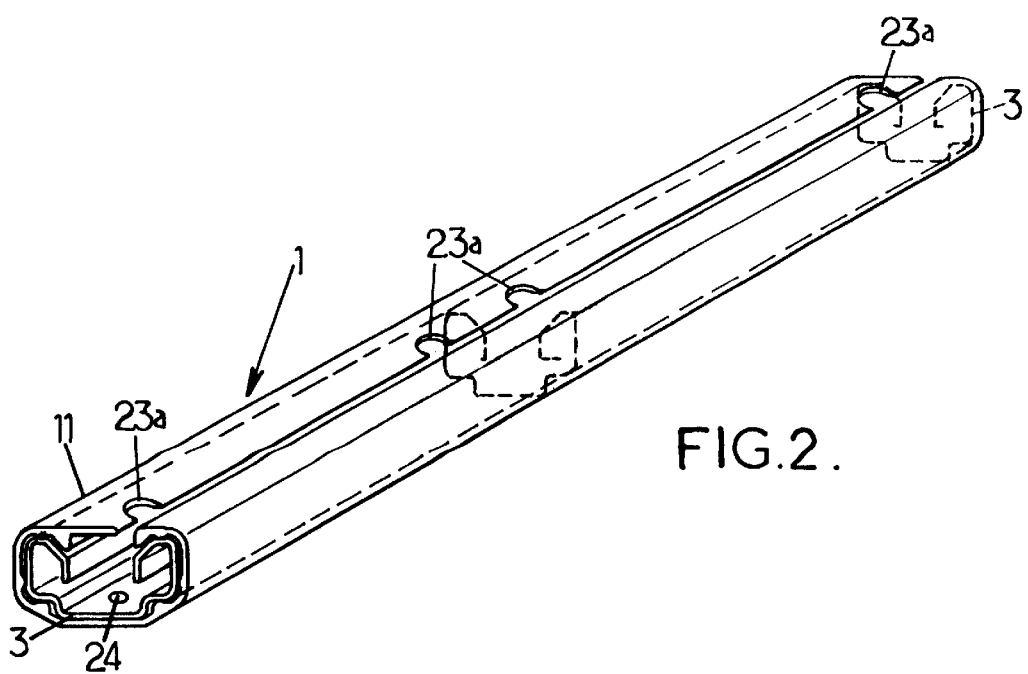
FIG. 2 is a perspective view of the fixed part of a slide rail according to a second version form of the invention.

As shown in FIG. 2, the slide rail may if need be comprise not just one, but several fixed steel sections 3 which are simply abutted behind each other inside the same fixed outer section 11. Indeed, bearing in mind the respective manufacturing methods of the fixed steel sections (cutting, fitting, bending) and of the fixed outer section (extrusion), the manufacture of a fixed outer section 11 of great length presents no difficulty, whereas the manufacture of a fixed steel section 3 of great length is relatively difficult.

We claim:

1. A slide rail for a vehicle seat, comprising first and second fixed steel sections having a same U-shaped cross section, said first and second fixed steel sections each having:

a bottom, two side flanges extending parallel to each other, each from the bottom up to a free end, and two fold back flanges extending towards each other respectively from the free ends of the two side flanges, defining between them a slot intended to receive at least one support component adapted to be fixed to the vehicle seat, the first and second fixed steel sections additionally comprising fixing means intended to fix respectively said first and second fixed steel sections to the vehicle floor, wherein the first fixed steel sections is fitted over all its length into a fixed outer section made by extrusion from a material selected from aluminum-based materials and plastic materials, said fixed outer section being fixed to the first fixed steel section and having an approximately U-shaped cross section, said fixed outer section comprising:

a bottom bearing against the bottom of the first fixed steel section, two side flanges which surround the side flanges of the first fixed steel section, and two fold back flanges which extend from the side flanges of said fixed outer section and which cover the fold back flanges of the first fixed steel section, and wherein said second fixed steel section is also fitted into the fixed outer section, the first and second fixed steel sections being simply abutted one behind the other in said fixed outer section.

2. A slide rail according to claim 1, wherein the side flanges of the first and second fixed steel sections are held tightly, without play, between the side flanges of the fixed outer section.

3. A slide rail according to claim 2, wherein the side flanges of the fixed outer section each comprise at least one longitudinal inner rib which bears against the corresponding side flanges of the first and second fixed steel sections.

4. A slide rail according to claim 1, wherein the fold back flanges of the fixed outer section bear against the fold back flanges of the first and second fixed steel sections and apply the bottom of said first and second fixed steel sections against the bottom of the fixed outer section.

5. A slide rail according to claim 4, wherein each fold back flange of the fixed outer section comprises at least one longitudinal inner rib which bears against the corresponding fold back flange of the first fixed steel section.

6. A slide rail according to claim 4, wherein the bottom of the fixed outer section comprises longitudinal inner ribs which each bear against side projections belonging respectively to the bottoms of the first and second fixed steel sections.

7. A slide rail according to claim 1, wherein the fixing means of the first and second fixed steel sections comprise holes provided respectively in the bottom of said first and second fixed steel section to receive screws intended to be fixed to the vehicle floor, the bottom of the fixed outer section also comprising holes facing the holes provided in the bottom of the first and second fixed steel sections to allow said screws to pass therethrough.

8. A slide rail according to claim 7, wherein the fixing means of the first and second fixed steel sections comprise screws which pass respectively through the holes provided in the bottom of the first and second fixed steel sections and in the bottom of the fixed outer section, said screws comprising widened heads which bear respectively against the bottoms of the first and second fixed steel sections.

9. A slide rail according to claim 1, wherein the fold back flanges of the fixed outer section are extended laterally outwards by projecting rims.

10. A slide rail according to claim 1, wherein the fixed outer section covers the first and second fixed inner section over all their length.

11. A slide rail according to claim 1, additionally comprising a movable section which slides in the first and second fixed steel sections, said movable section being partially covered by the fixed outer section between the two fold back flanges of each of the first and second fixed steel sections and said movable section comprising a web which extends parallel to the side flanges of the first and second fixed steel sections and which passes through a slot delimited between the two fold back flanges of the fixed outer section.

* * * * *

UNITED STATES PATENT AND TRADEMARK OFFICE
CERTIFICATE OF CORRECTION

PATENT NO.   : 6,427,962 B1                                              Page 1 of 1
DATED        : August 6, 2002
INVENTOR(S)  : René Rohee and Samuel Levaelois It is certified that error appears in the above-identified patent and that said Letters Patent is hereby corrected as shown below:

<u>Column 6,</u>
Lines 19-21, please replace the current wording of claim 10 with:

A side rail according to claim 1, wherein the fixed outer section covers the second fixed steel sections over all the length thereof.

Signed and Sealed this

Twelfth Day of August, 2003

JAMES E. ROGAN
*Director of the United States Patent and Trademark Office*